Aug. 16, 1960 F. T. ANDREWS, JR., ET AL 2,949,503

PULSE MODULATION SYSTEM FRAMING CIRCUIT

Filed May 21, 1958 4 Sheets-Sheet 1

INVENTORS F. T. ANDREWS, JR.
H. MANN

BY W. L. Keefauver

ATTORNEY

INVENTORS F. T. ANDREWS, JR.
H. MANN
BY W. L. Keefauver
ATTORNEY

Aug. 16, 1960 F. T. ANDREWS, JR., ET AL 2,949,503

PULSE MODULATION SYSTEM FRAMING CIRCUIT

Filed May 21, 1958 4 Sheets-Sheet 3

INVENTORS F. T. ANDREWS, JR.
H. MANN
BY W L Keefauver
ATTORNEY

INVENTORS F. T. ANDREWS, JR.
H. MANN
BY W. L. Keefauver
ATTORNEY 2,949,503

PULSE MODULATION SYSTEM FRAMING CIRCUIT

Frederick T. Andrews, Jr., and Henry Mann, Berkeley Heights, N.J., assignors to Bell Telephone Laboratories, Incorporated, New York, N.Y., a corporation of New York Filed May 21, 1958, Ser. No. 736,724

17 Claims. (Cl. 179—15)

This invention relates to pulse communication multiplexing systems and, in particular, to the synchronizing of receiver apparatus with transmitter apparatus.

Although the present invention is applicable to pulse communication systems in general, it is described and illustrated in the form of pulse code modulation (PCM) multiplexing systems.

Basically, the transmission of messages by a PCM multiplexing system involves the steps of periodically sampling the messages, encoding the samples, and sequentially transmitting the encoded samples in an interlaced manner to a receiver where they are translated back into the original messages. Each of the encoded samples comprises a group of pulses and spaces (sometimes referred to as ON and OFF pulses, respectively) which represent digits of a number system and occupy significant positions (sometimes referred to as time slots) in the groups. Furthermore, when multiplexing, a sequency of encoded samples comprising one encoded sample of each of the messages is sometimes referred to as a frame.

At the receiving end of a multiplexing system, it is necessary to decode and distribute the messages to a plurality of output channels. In order to decode and distribute the messages correctly, a receiver and its transmitter must operate in synchronism. Because the encoded samples are transmitted in frames, synchronizing is sometimes referred to as framing or phasing.

It is known in the prior art to transmit, in addition to encoded samples, framing information of the ON-OFF pulse type. This information is detected at the receiver and utilized for establishing and maintaining the correct phase relationship between the transmitter and receiver. In U.S. Patent 2,527,650, issued October 31, 1950 to E. Peterson, for example, there is described a PCM multiplexing system in which a framing digit, comprising alternately a pulse and a space, replaces the same relative encoding digit in successive frames of encoding digits. This particular pattern of framing digits has been found to be less easily confused with message digits than a pattern of all ON or all OFF pulses. The receiver in this system includes a distributor, for example a ring circuit of intercoupled multivibrators, which produces outputs for sequentially activating a plurality of gates connected between decoding apparatus and respective output channels. When the system is in frame, the messages are distributed to the correct output channels. When the system is initially put into action or when framing has been lost because of some discontinuity in service, the decoder apparatus and the distributor are periodically dropped back in phase by one time slot until framing is achieved.

The Peterson system features a synchronizing circuit arrangement which compares the rotational position of the distributor with the received information and produces an output for driving both the distributor and the decoding apparatus. This circuit arrangement includes fast and slow acting channels which cooperate to retard the drive on the distributor and the decoding apparatus when the receiver is out of frame. The slow acting channel prevents retardation until a sufficient number of time slots has been examined to determine with certainty that framing has been lost. This channel permits the system to distinguish between a true loss of framing and a momentary interruption of transmission. Once a true loss of framing has been identified by the slow acting channel, the fast acting channel is enabled and phase retardation is started. In order to insure recognition of the framing digits, inherent characteristics of this synchronizing circuit arrangement make it necessary to limit the drop-back of the distributor and the decoding apparatus to a maximum rate of one time slot for every two cycles of the distributor. (The term "maximum rate" used in the previous sentence and elsewhere in this specification means that this is the rate of retardation possible in the absence of false in-frame indications. False in-frame indications are produced by message digits in time slots under inspection when the pattern of these digits corresponds to that of the framing digits. These false indications usually occur randomly and persist for relatively short intervals.)

One object of the present invention is to decrease further the time necessary for establishing framing in a pulse communication system in which framing digits comprise ON-OFF pulses.

The present invention, in one of its broader aspects, differs from the Peterson system in that a decision is made during each frame of received digits as to both the time slot to be inspected in the succeeding frame for a framing digit and the character of the digit that should appear in that time slot if the time slot contains a framing digit. When a digit of a different character is found to reside in the inspected time slot, an error pulse is produced. As in the Peterson system, the present invention provides slow and fast acting channels. Therefore, when a sufficient number of errors have been detected to ascertain with a relatively high degree of accuracy that an out-of-phase condition exists, these error pulses are utilized for retarding the receiver in phase.

The present invention in one of its simplest forms provides error pulses at a maximum rate equal to the rate framing information is inserted in the encoded information. When, for example, one of the simplest embodiments of the invention is used in place of the synchronizing circuit arrangement of the Peterson system, a true out-of-frame condition can be detected and framing can be effected in one half of the time previously necessary in the absence of false in-frame indications produced by encoding digits. In another form of the present invention, a maximum retardation rate which is greater than the rate framing digits are inserted in the encoded information is provided at the expense of additional equipment. In still another form of the invention, a reduction in the possibility of false in-frame indications produced by encoding digits is also provided at the expense of both additional equipment and framing digit transmission time.

In the above-described Peterson system, framing digits are inserted in the transmitted information by replacing one encoding digit in each frame of digits with a framing digit. This results in a slight degradation of one of the messages. When such degradation is not desirable, the synchronizing or framing digits are inserted between the encoded samples. A transmitter which inserts framing information in this manner is disclosed in application, Serial No. 704,929, filed December 24, 1957, by H. Jamison and R. L. Wilson. In one of its forms, the transmitter described in that application delays the encoding of message samples once during each frame for the duration of at least one time slot and inserts framing information in these time slots. Because the encoding of message samples is periodically delayed in this transmitter, its companion receiver must be timed accordingly before synchronization can be established.

Another object of the present invention is to establish and maintain framing between a receiver and transmitter in a pulse communication system in which framing digits are inserted in the transmitted information by either replacing encoded information with framing digits or inserting framing information between encoded information. In accordance with the invention, the incoming information is decoded and the distributor is advanced at a uniform rate when framing digits replace encoding digits and the system is in synchronism. When framing digits are inserted between encoded message samples, the incoming information is decoded and the distributor is advanced at a nonuniform rate when the system is in synchronism.

In one embodiment of the invention, a logic circuit is provided which determines during each frame of received digits the character of digit that must be received in the following frame during a particular rotational position of a distributor in order for the system to be in synchronism. (When the system is in frame, this rotational position of the distributor corresponds timewise to the reception of framing digits.) When a digit of a different character is inspected, an error pulse is produced. The error pulses are coupled to a slow acting channel where they are accumulated in an integrating circuit having a controlled rate of decay. The integrating circuit, in turn, trips a voltage amplitude detector circuit when the accumulated charge reaches a predetermined level. When the voltage amplitude detector is tripped, a fast acting channel is activated and the error pulses are coupled to both a frequency dividing circuit and the above-mentioned logic circuit. The frequency dividing circuit supplies timing pulses to the distributor, the logic circuit, and a decoder. When an error pulse is applied to the frequency dividing circuit, its dividing factor is increased by one for one dividing cycle, which retards the timing pulses in phase with respect to the received digits by one time slot. Retardation continues until digits of the expected character are inspected during each frame, at which time the system is in synchronism and error pulses are no longer produced.

In several embodiments of the present invention, a pattern of framing digits comprising alternate pulses and spaces is used because they are less easily confused with encoding digits than all ON or all OFF framing digits. With such a pattern of framing digits, it is necessary to examine at least two digits to detect an out-of-frame condition. In the Peterson system where one framing digit is inserted in each frame, for example, it was found necessary to limit the drop-back action of the receiver to one time slot for two successive frames. A feature of the present invention comprises a logic circuit which, although it must examine two digits to detect an out-of-frame condition, examines the digits in such a manner that a faster framing action is accomplished. When one framing digit is inserted in each frame, as in the Peterson system for example, the drop-back action of the receiver, when using one of the simplest embodiments of the present invention, can occur at a rate equal to one time slot for each frame. In particular, the logic circuit determines in each frame what the character of the digit to be inspected in the next frame must be in order to be a framing digit. Because two examinations, in effect, are made in each frame, only one half of the time previously necessary for detecting an out-of-frame condition is required. This may be further appreciated by considering the case of the system being out of frame and a digit having just been inspected and found to be of the wrong character so that the receiver is retarded in phase by one time slot. The time slot subsequent to the one which was just inspected is now the one under examination. The logic circuit immediately examines this subsequent time slot and determines the character of the digit that must exist in the corresponding time slot in the next frame for the system to be in frame. It is therefore possible to detect an out-of-frame condition within the period of one frame.

In the previously mentioned Jamison-Wilson application, a frame of digits comprises, timewise, equal message sample time intervals plus a shorter interval for framing information. Because of this shorter framing information interval, correct phasing cannot be achieved by advancing a distributor and decoding message samples at a uniform rate. A feature of the present invention is a circuit arrangement which causes a distributor to advance and a decoder to decode at a nonuniform rate. In the above-described embodiment, this circuit arrangement increases the dividing factor of the frequency dividing circuit by one for one of its dividing cycles during each frame. In other words, when a framing digit is inserted in the same relative time slot in successive frames, the distributor is advanced so that it remains in one of its rotational positions for a length of time which is one time slot longer than the time spent in each of the remainder of its positions. Each time the distributor is delayed, the decoding of the incoming digits is likewise delayed.

Other objects and features of the invention will be apparent from a study of the following detailed descriptions of several specific, illustrative embodiments.

Figure 1:
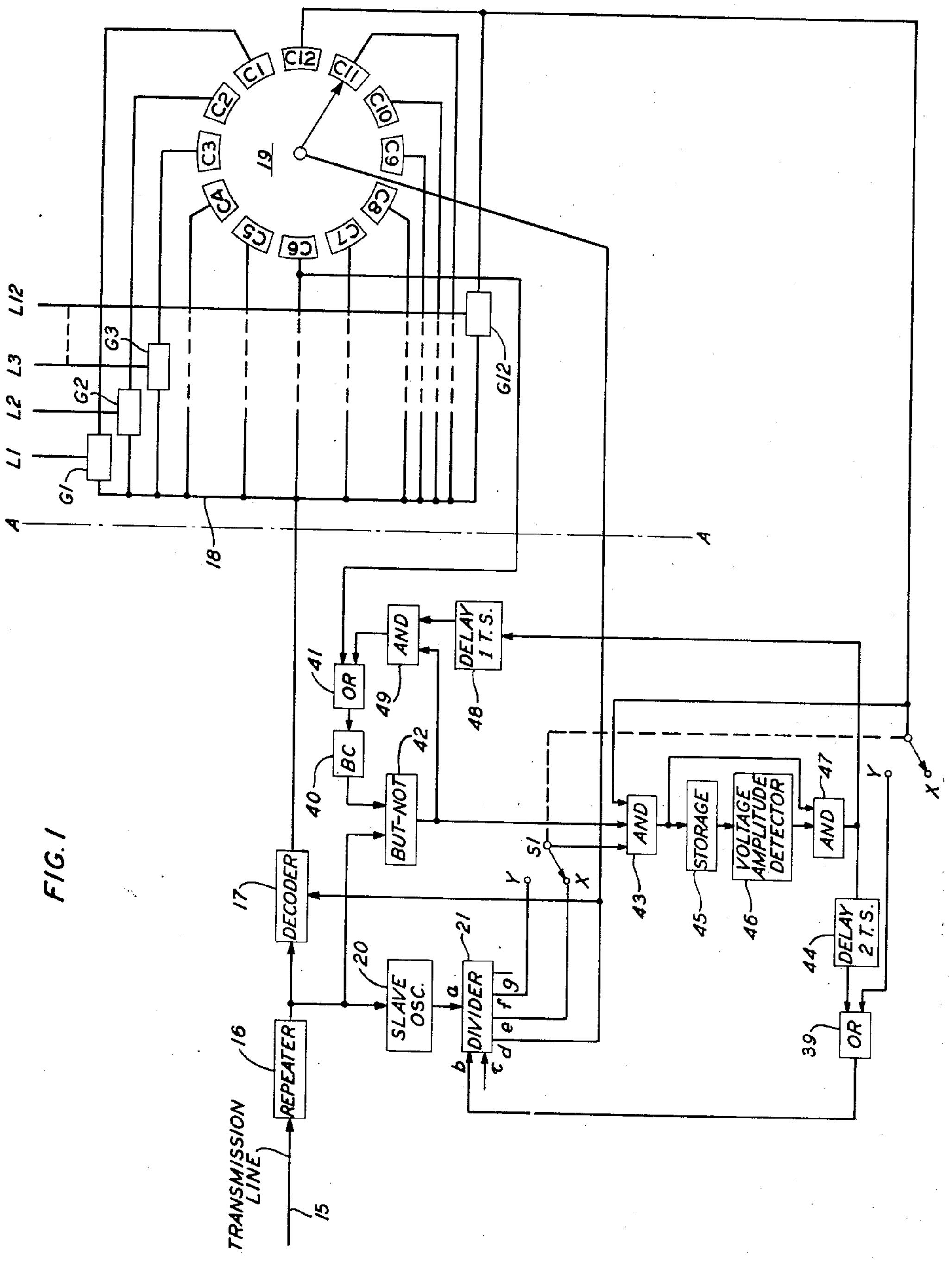
Fig. 1 shows a block diagram of PCM multiplexing receiver apparatus illustrating principles of the invention.

In Fig. 1, a block diagram of PCM multiplexing receiver apparatus embodying the invention is shown which may be used in systems in which framing digits, comprising alternate pulses and spaces, are inserted in frames of encoded signals. A transmission line 15 applies received digits to a repeater 16 wherein the digits are regenerated to compensate for any deterioration produced during transmission. The regenerated digits are decoded by a decoder 17 and then applied to the transmission inputs of a plurality of gating circuits G1 through G12 by a bus 18. Gating circuits G1 through G12 are enabled in a sequential order by output pulses from contacts C1 through C12 of a distributor 19. Distributor 19 may comprise, for example, a ring circuit of intercoupled multivibrators. When distributor 19 is in frame with the received digits, the outputs of decoder 17 are correctly distributed to a plurality of output channels L1 through L12.

Connected to the output of repeater 16 is a slave oscillator 20 which produces pulses at the basic repetition rate of the received digits. The pulses from the slave oscillator are coupled into an input *a* of a frequency divider 21. The frequency divider 21 also has inputs *b* and *c* and outputs *d*, *e*, *f* and *g*. Although input *c* and output *g* are not used in the embodiment of Fig. 1, they are used in at least one of the embodiments of Figs. 3 and 4. As these connections are used in embodiments discussed subsequently, the complete operation of the divider is presented at this time. When inputs *b* and *c* are not activated, the divider 21 produces pulses at outputs *d* and *e* at a repetition rate which is a submultiple of the repetition rate of the pulses applied to input *a*. Furthermore, the pulses produced at output *e* are phase displaced with respect to those produced at output *d*. Each time a pulse is applied to input *b*, the repetition rate of the pulses appearing at outputs *d* and *e* is decreased for one dividing cycle of the divider and a pulse appears at output *f* during this cycle. The repetition rate of the pulses appearing at outputs *d* and *e* is further decreased for one cycle each time pulses are applied to both inputs $b$ and $c$. Furthermore, pulses appear at both outputs $f$ and $g$ during this cycle.

Figure 2:
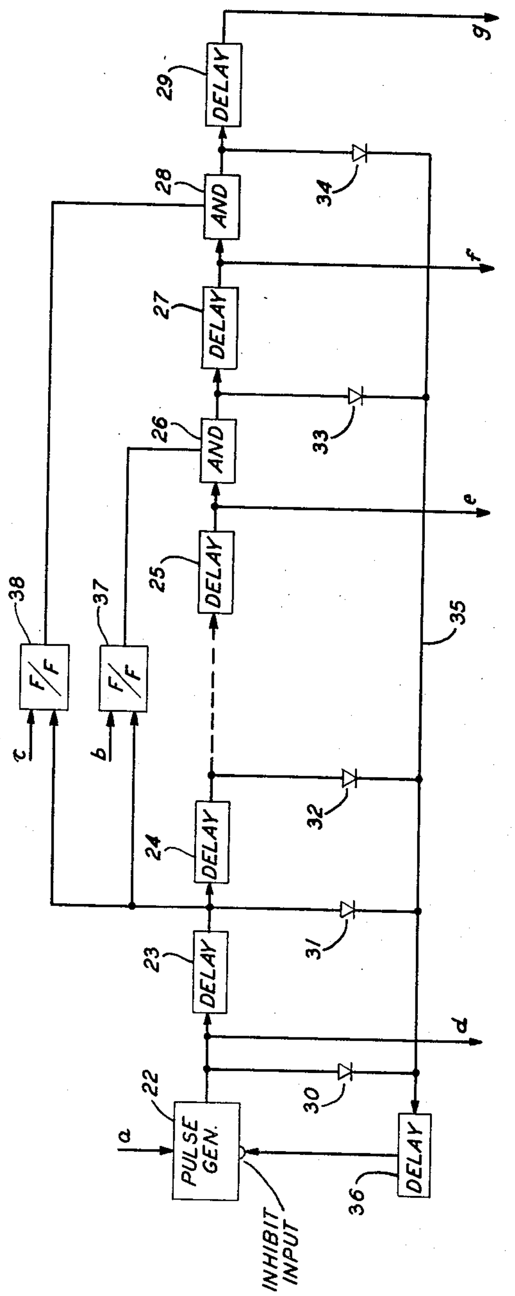
Fig. 2 shows a block diagram of one specific frequency divider which may be used in the receiver apparatus illustrated in Figs. 1, 3 and 4.

The operation of frequency divider 21 may be further appreciated by referring to Fig. 2. Fig. 2 comprises a block diagram of a pulse distributing arrangement disclosed in application, Serial No. 704,928, filed December 24, 1957 by R. L. Wilson, which may be used as divider 21. Identical symbols have been used for the inputs and outputs in both Figs. 1 and 2. Input $a$ comprises an input of a pulse generator 22 which also has an inhibit input. When the inhibit input is energized, the output of generator 22 is inhibited. The output of generator 22 is applied to the first of a plurality of serially connected delay circuits 23 through 25. Pulse generator 22 is adapted to produce, in in the absence of any signal on its inhibit input, a train of output pulses having the same basic repetition rate as the signals applied to input $a$. If this basic repetition rate is considered to be $n$, each of delay circuits 23 through 25 is arranged to produce a delay equal to $$\frac{1}{n}$$

Delay circuit 25 has its output connected to the transmission input of a normally disabled AND gate 26 which applies its output to a delay circuit 27. The output of delay circuit 27 is applied to the transmission input of another normally disabled AND gate 28 which applies its output to a delay circuit 29. Delay circuits 27 and 29 each produce a delay equal to $$\frac{1}{n}$$

The outputs of generator 22, delay circuits 23 and 24 and AND gates 26 and 28 are connected by diodes 30 through 34, respectively, to an inhibit bus 35. A delay circuit 36, which produces a delay equal to $$\frac{1}{n}$$

is connected between inhibit bus 35 and the inhibit input of generator 22. When AND gate 26 of Fig. 2 is in its normally disabled condition, a pulse from generator 22 produces a series of pulses on bus 35, the first of which appears substantially simultaneously with the output pulse of generator 22, while the remaining pulses occur at $$\frac{1}{n}$$

intervals. The actual number of pulses that are coupled to the bus 35 is determined by the number of serially connected delay circuits prior to delay circuit 25. In the particular arrangement shown in Fig. 2, three pulses are coupled to bus 25. The three pulses on bus 35 are delayed by an interval $$\frac{1}{n}$$

in delay circuit 36 and are applied to the inhibiting input of generator 22 so that what would normally constitute output pulses two through four of generator 22 do not occur. The repetition rate of the pulses produced at outputs $d$ and $e$ when AND gate 26 is disabled is $$\frac{n}{4}$$

or one fourth of the repetition rate of the pulses applied to input $a$. When AND gate 26 is enabled, four pulses appear on bus 35 which, in turn, are applied to the inhibit terminal of generator 22 to inhibit what would otherwise comprise output pulses two through five. The repetition rate of the pulses produced at outputs $d$ and $e$ when AND gate 26 is enabled is, therefore, $$\frac{n}{5}$$

or one fifth of the repetition rate of the pulses applied to input $a$. When AND gates 26 and 28 are enabled, the repetition rate of the pulses produced at outputs $d$ and $e$ is $$\frac{n}{6}$$

or one sixth of the repetition rate of the pulses applied at input $a$. Furthermore, pulses are produced at output $f$ when AND gate 26 is enabled and at outputs $f$ and $g$ when AND gates 26 and 28 are both enabled.

The enabling inputs of AND gates 26 and 28 are controlled by the output of flip-flop circuits 37 and 38. One of the inputs of each of flip-flop circuits 37 and 38 is connected to the output of delay circuit 23, while the remaining inputs are connected to inputs $b$ and $c$, respectively. In the absence of signals applied to inputs $b$ and $c$, the output of delay circuit 23 maintains flip-flop circuits 37 and 38 in a condition so that their outputs do not enable AND gates 26 and 28. When pulses are applied to inputs $b$ and $c$, the conditions of flip-flop circuits 37 and 38 are changed so that AND gates 26 and 28 are enabled. During the dividing cycle following the one in which pulses are applied to inputs $b$ and $c$, the output of delay circuit 23 changes the condition of flip-flop circuits 37 and 38 so that AND gates 26 and 28 are in their normally disabled condition. Each time a pulse is applied to input $b$, therefore, the dividing factor of the arrangement is increased by one for one dividing cycle and a pulse appears at output $f$ at an interval equal to one time slot after a pulse appears at output $e$. Furthermore, each time a pulse is applied to both inputs $b$ and $c$, the dividing factor is increased by two for one dividing cycle and pulses appear at outputs $f$ and $g$ at intervals equal to one and two time slots, respectively, after a pulse appears at output $e$.

In the arrangement of Fig. 2, the number of delay circuits prior to delay circuit 25 determines both the dividing characteristics of the arrangement and the time displacement between pulses appearing at output $d$ and pulses appearing at outputs $e$, $f$ and $g$. The number of delay circuits that are used are determined by the extent to which the message samples are encoded. The arrangement shown may be used in a system in which a four digit code is employed. When an eight digit code is employed, for example, six delay circuits must be used prior to delay circuit 25.

In Fig. 1, output $d$ of frequency divider 21 is applied to decoder 17 for timing purposes and to distributor 19 for advancing the distributor. In the absence of input pulses to input $b$ of frequency divider 21, decoder 17 decodes and distributor 19 advances at a uniform rate as the output pulses from output $d$ are at a fixed submultiple of the pulses applied to input $a$. When a pulse is applied to input $b$, the dividing factor of divider 21 is increased for one dividing cycle. Increasing the dividing factor for one dividing cycle causes all subsequent pulses appearing at output $d$ to be time displaced by one time slot from the time they would have appeared in the absence of a pulse applied to input $b$. This time displacement of the pulses causes the decoding in decoder 17 and the advancement of distributor 19 to be retarded in phase by one time slot.

In accordance with one feature of the invention, decoder 17 may decode and distributor 19 may advance at either a uniform or a nonuniform rate. This feature enables the invention to be used in systems in which framing digits either replace encoding digits or are inserted between encoded message samples. In the embodiment of Fig. 1, decoder 17 and distributor 19 operate at a uniform rate when signals are not applied to input *b* of frequency divider 21, which is the desired condition when framing digits replace encoding digits. When framing digits are inserted between encoded messages samples, the operation of decoder 17 and distributor 19 must be interrupted in synchronism with the framing digits before correct phasing may be effected. The operation of decoder 17 and distributor 19 is effected by applying to input *b* of divider 21 pulses that correspond in time to the framing digits when the system is in frame. When the arrangement of Fig. 1 is used in a system in which a framing digit is inserted between the last encoded sample of one frame and the first encoded sample of the following frame, the pulses appearing at contact C12 of distributor 19 are applied via a switch S1 and an OR gate 39 to input *b* of divider 21. By this arrangement, the operation of decoder 17 and distributor 19 is interrupted when the framing pulses occur when the system is in frame.

A bistable circuit comprising a binary cell 40 and an OR gate 41 is connected to contact C6 of rotative distributor 19. Binary cell 40 produces an ON-OFF type of output which alternates at the same rate as the framing digits. In the embodiment of Fig. 1, this output is altered once for each cycle of distributor 19. A BUT-NOT gate 42, which is sometimes known as a disparity recognizer, compares the output of repeater 16 with the output of binary cell 40 and produces a pulse (i.e., an ON pulse) when its inputs do not agree and a space (i.e., an OFF pulse) when its inputs agree.

As mentioned previously, the embodiment of Fig. 1 is for use when framing digits in the received information comprise alternately a pulse and a space in the same relative time slots in successive frames. Because of the alternating characteristic of the output of binary cell 40, BUT-NOT gate 42 produces the same output for all framing digits. Whether this output comprises all ON pulses or all OFF pulses depends upon the phase relationship between the framing digits and the output of binary cell 40. Although either an all ON or all OFF pulse output from BUT-NOT gate 42 may be used in practicing the invention, the all OFF condition is used in the embodiment shown in Fig. 1.

An AND gate 43 having three inputs is used to pass the output of BUT-NOT gate 42 when distributor 19 is in the rotational position during which framing digits are received when the system is in frame. One of the two enabling inputs of AND gate 43 is energized when the rotational position of distributor 19 corresponds with contact C12. The present invention provides two sources of pulses for the other enabling input of AND gate 43. One source of pulses applied to this second input is used when framing digits replace encoding digits, while the other source is used when framing digits are inserted between encoded message samples. The sources are selected by a double-pole, double-throw switch S1. The switch S1 is placed in the position identified by *x* in Fig. 1 when a framing digit replaces the last encoding digit of each frame of digits. When switch S1 is in position *x*, AND gate 43 is enabled when pulses are produced simultaneously at output *e* of divider 21 and contact C12 of distributor 19. By this arrangement, AND gate 43 is enabled once during each cycle of distributor 19. When distributor 19 is in phase with the received digits, AND gate 43 is enabled during the intervals the framing digits are received.

The switch S1 is placed in the position identified by *y* when a framing digit is inserted between the last encoded sample of one frame and the first encoded sample of the following frame. When switch S1 is in position *y*, pulses from contact C12 of distributor 19 are applied by OR gate 39 to input *b* of frequency divider 21 and pulses from output *f* of divider 21, along with pulses from contact C12, are applied as enabling pulses to AND gate 43. As discussed previously, applying a pulse to input *b* of divider 21 changes the dividing factor for one dividing cycle and causes a pulse to be produced at output *f*. By this arrangement, AND gate 43 is enabled each time the decoding and distributing of the message samples are interrupted. When distributor 19 is in phase with the received digits, the interruption of the decoding and distributing of the message samples and the enabling of AND gate 43 occur during the intervals the framing digits are received.

An error detecting circuit comprising storage circuit 45, a voltage amplitude detector 46 and an AND gate 47 is used to inspect the output of AND gate 43. Storage circuit 45, which may comprise a resistor-capacitor type of integrating circuit, produces an output voltage having an amplitude dependent upon both the number of ON pulses produced by AND gate 43 and the intervals between the pulses. The output of storage circuit 45 is monitored by a voltage amplitude detecting circuit 46 which may comprise the cathode coupled binary circuit disclosed in Figs. 5–17 and discussed beginning on page 164 of Pulse and Digital Circuits by Millman and Taub, published by McGraw-Hill (1956). This binary circuit, which is also sometimes referred to as the Schmitt circuit, is turned on to produce a more positive output voltage when its input voltage level reaches a predetermined level. Because of a hysteresis or backlash characteristic of this circuit, the amplitude of the input voltage at which the circuit is turned off is less than the value at which it is turned on. This hysteresis characteristic permits this circuit, when used as voltage amplitude detector 46, to provide an output signal even though the amplitude level of the signal provided by storage circuit 45 decreases slightly between ON pulses. When the error pulse rate falls below a predetermined level, the hysteresis effect is overcome and the circuit turns off. Storage circuit 45 and voltage amplitude detector 46 comprise a slow acting channel which inspects the output of AND gate 43 for a sufficient length of time to determine with certainty that an out-of-frame condition exists. When voltage amplitude detector 46 is turned on, AND gate 47 is enabled to pass the output of AND gate 43. ON pulses passed by AND gate 47 are delayed for two time slots in a delay circuit 44 and then applied by OR gate 39 to input *b* of divider 21. As discussed previously, a pulse applied to input *b* causes the dividing factor of frequency divider 21 to be increased for one dividing cycle and the advancement of distributor 19 to be retarded in phase by one time slot. Through the use of delay circuit 44, the dividing factor is increased for the dividing cycle immediately following the one during which an error was detected.

In accordance with another feature of the invention the time slot subsequent to one causing retardation of decoder 17 and distributor 19 is assumed to contain a framing digit and, when necessary, the phase relationship between binary cell 40 and distributor 19 is changed so that the output produced by BUT-NOT gate 42 for this subsequent time slot comprises an OFF pulse. This feature is accomplished in the disclosed embodiment by a circuit arrangement comprising a delay circuit 48 and an AND gate 49. Error pulses produced by AND gate 47 are delayed for one time slot in delay circuit 48 and then are used to enable AND gate 49. AND gate 49 is enabled, therefore, during the time slots subsequent to the ones producing the error pulses. When the output from BUT-NOT gate 42 is an OFF pulse in the time slot subsequent to one producing an error pulse, the correct phase relationship exists between binary cell 40 and distributor 19 for this subsequent time slot. When the output from BUT-NOT gate 42 is an ON pulse for the time slot subsequent to one producing an error pulse, an incorrect phase relationship exists and the ON pulse is applied to binary cell 40 through AND gate 49 and OR gate 41. The condition of binary cell 40 is changed and the digit in this subsequent time slot would now produce an OFF pulse. In the next frame of digits AND gate 43 is enabled during the time slot corresponding to the one assumed to contain a framing digit. When the system is in frame, AND gate 43 passes OFF pulses during subsequent frames and error pulses are not produced. When the system is not in frame, AND gate 43 may pass either an OFF or an ON pulse because of the random nature of the message digits. If an ON pulse is passed, decoder 17 and distributor 19 are retarded and the condition of binary cell 40 is checked for the next subsequent time slot. On the other hand, if an OFF pulse is passed, a false in-frame condition is indicated and decoder 17 and distributor 19 are not retarded. As discussed previously, these false in-frame indications occur randomly and persist for relatively short intervals. Therefore, an ON pulse is soon passed by AND gate 43 and decoder 17 and distributor 19 are retarded. In either case, subsequent time slots are examined until framing is effected.

Figure 3:
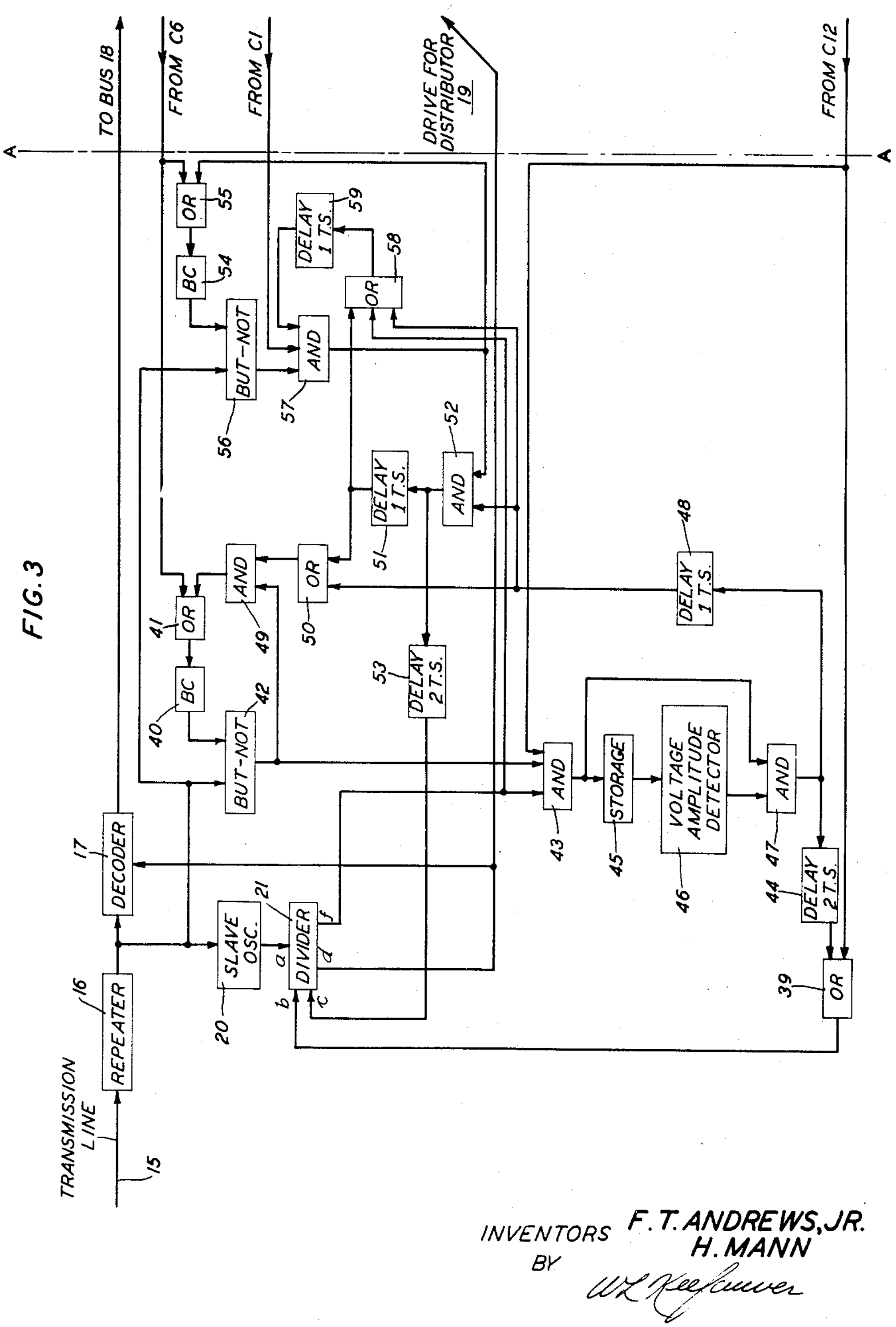
Figs. 3 and 4 show partial block diagrams of other PCM multiplexing receiver apparatus illustrating principles of the invention.

The block diagram of Fig. 3, in conjunction with the portion of the block diagram to the right of line A—A of Fig. 1, illustrates another embodiment of the present invention. This embodiment, like that disclosed in Fig. 1, may be used in system in which a framing digit, comprising alternately a pulse and a space, is inserted in the same relative time slot of each frame of digits. Although the embodiment of Fig. 3 requires more circuitry than that of Fig. 1, it provides a faster framing action. In particular, this arrangement contains all of the features found in the arrangement of Fig. 1 plus a monitoring feature which enables it to provide a faster framing action. This monitoring feature comprises monitoring the time slot subsequent to the one being inspected for a framing digit. When an out-of-frame condition is detected and the monitoring circuit indicates that the subsequent time slot does not contain a framing digit, the decoder and the distributor are retarded in phase by two time slots. The maximum rate of retardation of this embodiment is, therefore, twice that of Fig. 1.

Fig. 3 contains all of the elements and connections of Fig. 1 with two exceptions. The first exception is that switch S1 has been omitted in order to simplify the diagram. Although the arrangement shown in Fig. 3 is for use in systems in which framing digits are inserted between encoded samples, the circuit utilizing contact *x* of switch S1 of Fig. 1 may be substituted when framing digits replace encoding digits.

The second exception is that an OR gate 50 having two inputs has been inserted between delay circuit 48 and AND gate 49. The second input of OR gate 50 is connected to a delay circuit 51 which provides a delay of one time slot to the output from an AND gate 52. The inputs of AND gate 52 are respectively connected to the outputs of delay circuit 48 and the monitoring arrangement. When an out-of-frame condition is detected and the monitoring arrangement indicates that the subsequent time slot does not contain a framing digit, AND gate 52 produces an ON pulse which is delayed in delay circuit 51 and then applied to AND gate 49 via OR gate 50. Under these conditions, AND gate 49 is enabled during the second time slot after AND gate 43 is enabled. This changes the phase relationship between binary cell 40 and distributor 19 when necessary so that BUT-NOT gate 42 would now produce an OFF pulse for the digit in this time slot. The output of AND gate 52 is also delayed for two time slots by a delay circuit 53 and then applied to input *c* of divider 21. When the receiver is out of frame and the monitoring circuit is not monitoring framing digits, inputs *b* and *c* of divider 21 are energized so that the receiver is delayed for two time slots and the newly selected time slot is inspected in the next frame of digits.

The monitoring circuit is very similar to other circuitry included in this embodiment and discussed with respect to Fig. 1. A bistable circuit comprising a binary cell 54 and an OR gate 55 is responsive to pulses from contact C6 of distributor 19 and produces an ON-OFF type of output in a manner identical to binary cell 40 and OR gate 41. A BUT-NOT gate 56 is responsive to both the output of binary cell 54 and the regenerated digits from repeater 16 and produces an output in a manner identical to BUT-NOT gate 42. The output of BUT-NOT gate 56 is passed to OR gate 55 by an AND gate 57 during one or more of the three time slots subsequent to those during which AND gate 43 is enabled. In particular, AND gate 57 has two enabling inputs one of which is energized during all of these three time slots by signals from contact C1 of distributor 19. The other enabling input is energized during one or more of these three time slots by ON pulses applied to it via an OR gate 58 and a delay circuit 59 which provides a delay of one time slot.

One input of OR gate 58 is connected to output *f* of divider 21 so that AND gate 57 is enabled once every frame during the time slot immediately following the time slot during which AND gate 43 is enabled. By this arrangement, it is assumed that the receiver is in frame and the phase relationship between binary cell 54 and distributor 19 is changed when necessary so that the digit in this immediately subsequent time slot would now cause BUT-NOT gate 56 to produce an OFF pulse. A second input to OR gate 58 is connected to delay circuit 48 so that AND gate 57 is enabled during the second time slots following those during which AND gate 47 passes error pulses. By this arrangement, it is known that the receiver is out of frame but it is assumed that the monitoring circuit has been monitoring the framing digits and that the receiver will be delayed by only one time slot to pull it into frame. Therefore, when this second input to OR gate 58 is energized, the phase relationship between binary cell 54 and distributor 19 is changed when necessary so that the digit in this second time slot would now cause BUT-NOT gate 56 to produce an OFF pulse. The last input to OR gate 58 is connected to the output of delay circuit 51 so that AND gate 57 is enabled during the third of these three time slots when the receiver is out of frame and the monitoring arrangement is not monitoring the framing digits. When this last input is energized, the phase relationship between binary cell 54 and distributor 19 is changed when necessary so that the digit appearing in this third time slot would now cause the BUT-NOT gate 56 to produce an OFF pulse.

To summarize the operation of the resetting feature of the monitoring circuit, the phase relationship between binary cell 54 and distributor 19 is left in the correct condition for the first, second or third digit following the one being inspected by AND gate 43, depending on whether the receiver is delayed for zero, one or two time slots, respectively.

The output of AND gate 57 is also coupled to AND gate 52 as an enabling input. AND gate 52, therefore, may be enabled during any one or more of the three time slots following those during which AND gate 43 is enabled. The other input to AND gate 52 is connected to delay circuit 48 and therefore receives an ON pulse input only during the first of these three time slots when the receiver is out of frame. As the enabling input applied to AND gate 52 during the first of these time slots is an indication that the monitoring arrangement has not been monitoring the framing digits, the output from AND gate 52 is an indication that the receiver should be delayed by two time slots. Delay circuit 53 applies the output to input *c* of divider 21 so that it cooperates with the error signal applied to input *b* to cause the dividing factor to be increased by two for one dividing cycle. As mentioned before, the output from AND gate 52 is also applied to OR gates 50 and 58 via delay circuit 51 so that the phase relationships between binary cells 40 and 54 and distributor 19 may be corrected when necessary.

Although the embodiment of Fig. 3 is subject to false in-frame indications in a manner similar to the previously described systems, its maximum retardation rate is twice that of Fig. 1.

Figure 4:
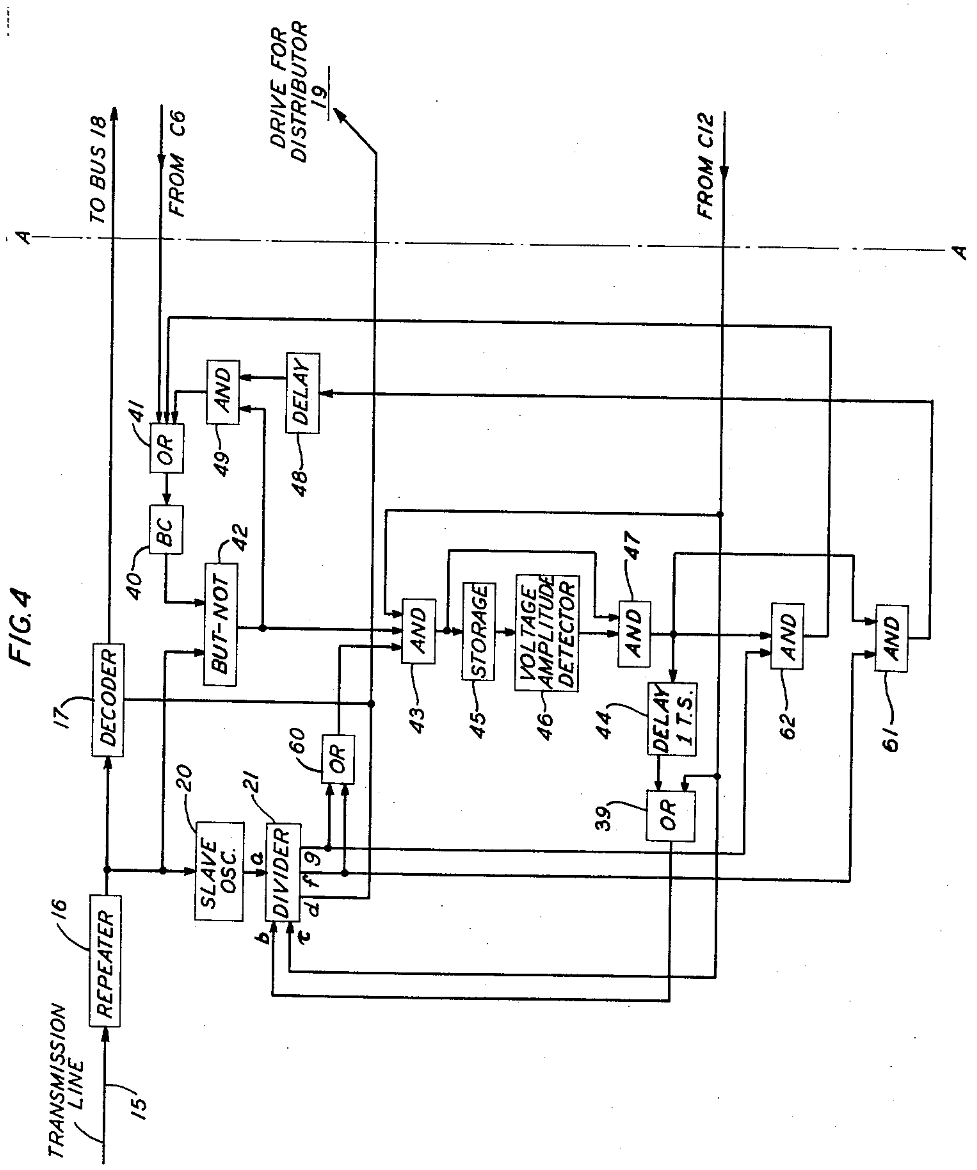

The block diagram of Fig. 4, in conjunction with the portion of the block diagram to the right of line A—A of Fig. 1, illustrates still another embodiment of the present invention. This arrangement differs from the previously described ones in that it may be used in systems in which a pair of framing digits, comprising alternately a pair of pulses and a pair of spaces, are inserted in the same relative time slots of each frame of digits. Although the embodiment of Fig. 4 requires both a greater percentage of the transmission time for transmitting framing information and more circuitry than that of Fig. 1, it requires less time for framing. This reduction in framing time is provided through the use of a more distinctive pattern of framing digits which causes fewer false in-frame indications to be produced by the encoding digits.

The embodiment shown in Fig. 4 is very similar to that of Fig. 1. Switch S1 of Fig. 1 has been omitted to simplify the diagram. As shown, this arrangement is for use in systems in which framing digits are inserted between encoded samples. Because two digits are inserted between the last encoded sample of each frame and the first encoded sample of the following frame, inputs *b* and *c* of frequency divider 21 are energized once for each revolution of distributor 19 by pulses from contact C12 of the member. When inputs *b* and *c* are energized, the decoding and distributing of message samples are interrupted for the duration of two time slots and pulses are produced at outputs *f* and *g* of divider 21. Pulses from outputs *f* and *g* are passed by an OR gate 60 to AND gate 43. When the receiver is in frame, AND gate 43 passes the output of BUT-NOT gate 42 during the time slots in which framing digits are received.

Pulses from outputs *f* and *g* are also used for enabling a pair of AND gates 61 and 62, respectively. AND gate 61, in effect, passes the first pulse of each pair of BUT-NOT gate 42 outputs passed by AND gate 43 while AND gate 62 passes the other. The output from AND gate 61 is delayed by delay circuit 48 and then enables AND gate 49. The output from AND gate 62 is applied to OR gate 41 and effects a phase change between the output of binary cell 40 and distributor 19.

The operation of the embodiment of Fig. 4 may be better understood by considering it both in an in-frame condition and in an out-of-frame condition. When the receiver is in-frame, AND gate 43 passes all OFF pulses and error pulses are not passed by AND gate 47. When the receiver is out of frame, several combinations of error pulse pairs are possible. These combinations comprise one ON and one OFF pulse, one OFF and one ON pulse and two ON pulses. Although each of these combinations indicates that the receiver is out-of-phase, it is possible for the second pulse in the error pulse pair to be produced by the first digit of a pair of framing digits. Because of this possibility, the retardation of the receiver is limited to one time slot each time an out-of-phase condition is detected. In other words, although AND gate 47 may pass two ON pulses in a pair of error pulses, the dividing factor of divider 21 is increased by only one for a cycle of its operation. This may be further appreciated by referring back to Fig. 2. The second of two consecutive ON pulses applied to input *b* of flip-flop circuit 37 does not affect the operation of the divider.

When the receiver is retarded in phase by one time slot, AND gate 43 passes, during the next cycle of distributor 19, a pair of BUT-NOT gate 42 outputs the first of which corresponds, time-slot-wise, to the second output of the previously passed pair of outputs. As in the previously described embodiments, the received digit producing this output is assumed to be a framing digit and the phase relationship between the output of binary cell 40 and distributor 19 is changed, if necessary, so that this output is an OFF pulse. When the error pulse combination comprises an ON and an OFF pulse, the ON pulse is applied to AND gate 49 via AND gate 61 and delay circuit 48. AND gate 49 is enabled, therefore, when BUT-NOT gate 42 produces an OFF pulse and, as this is the desired output for this time slot, the phase relationship between binary cell 40 and distributor 19 is not changed. When the error pulse combination comprises an OFF and an ON pulse, the ON pulse is applied via AND gate 62 to OR gate 41. The phase relationship between binary cell 40 and distributor 19 is immediately changed because the error ON pulse corresponds, time-slot-wise, to the first output passed by AND gate 43 during the next cycle of distributor 19. When a pair of ON error pulses are produced, OR gate 41 is energized simultaneously by outputs from AND gates 49 and 62 and the phase relationship between binary cell 40 and distributor 19 is changed.

Although the embodiment of Fig. 4 has a maximum error retardation rate of one time slot per cycle of rotative member 19, it is subject to fewer false in-frame indications because of the more distinctive pattern of the framing digits. It provides, therefore, a faster framing action at the expense of extra circuitry and framing digit transmission time than that provided by the embodiment of Fig. 1.

Various modifications of the illustrated embodiments may be made without departing from the scope of the invention. The particular number of output channels used in the disclosed embodiments, for example, is illustrative only. Furthermore, numerous blocks in the drawings were assumed to respond instantaneously. It sometimes happens that a particular circuit selected to perform a function set forth by one of these blocks has an inherent delay characteristic. Various expedients known in the art may be used to compensate for these inherent delay characteristics.

Although the invention has been described with respect to PCM systems, it may be used in other pulse communication systems. Furthermore, the invention may be employed in systems using framing digit patterns other than those mentioned in describing the principles of the invention.

What is claimed is:

1. In a pulse communication system in which transmitted digits comprise framing digits of the ON-OFF pulse type and encoding digits, receiver apparatus comprising a decoder, a plurality of output channels, a distributor for distributing the output of said decoder to said output channels, and control means responsive to said framing and encoding digits for establishing and maintaining said decoder and said distributor in phase with said encoding digits, said control means comprising timing means for producing timing pulses which, when correctly phased with said framing and encoding digits and applied to said decoder and said distributor, cause said encoding digits to be correctly decoded and distributed to said output channels, means for applying said timing pulses to said decoder and said distributor, means timed by said timing means for sampling said transmitted digits so that when in phase said sampled digits comprise said framing digits, said sampling means producing an output of a first kind for each of said sampled digits when said sampled digits comprise only said framing digits and an output of a second kind for at least one of said sampled digits when said sampled digits comprise said encoding digits, and means responsive to said second kind of outputs for causing said timing means output to be retarded in phase.

2. In combination with apparatus as defined in claim 1, second means timed by said timing means for a second sampling of said transmitted digits so that when in phase said second sampled digits comprise said encoding digits subsequent to said framing digits, said second sampling means producing an output of said first kind for each of said second sampled digits when said second sampled digits comprise only said framing digits and an output of said second kind for at least one of said second sampled digits when said second sampled digits comprise said encoding digits, and means responsive to said second kind of output produced by said second sampling means in response to the first of said second sampled digits for further retarding said timing means output when said timing means output is retarded by said second kind of output from the first mentioned said sampling means.

3. In combination with apparatus as defined in claim 1, means for limiting, when out-of-phase, the retardation of said distributor to the duration of one of said framing digits.

4. In a pulse communication system in which transmitted digits comprise framing digits of the On-Off pulse type and encoding digits, receiver apparatus comprising a decoder, a plurality of output channels, a distributor for distributing the output of said decoder to said output channels, and control means responsive to said transmitted digits for establishing and maintaining said decoder and said distributor in phase with said encoding digits, said control means comprising timing means for producing timing pulses which, when correctly phased with said transmitted digits and applied to said decoder and said distributor, cause said encoding digits to be correctly decoded and distributed to said output channels, means for applying said timing pulses to said decoder and said distributor, means having two conditions of operation for sampling said transmitted digits when the position of said distributor is that in which framing digits are received when said receiver is in phase, said sampling means producing a first kind of output for each of said framing digits and a second kind of output for at least one of said encoding digits when in one of said two conditions and said second kind of output for each of said framing digits and said first kind of output for at least one of said encoding digits when in the other of said two conditions, means responsive to said second kind of output for causing the output of said timing means to be retarded in phase, and phasing means for changing the condition of operation of said sampling means before said timing means output is retarded when the subsequent transmitted digit would cause said sampling means to produce said second output.

5. In combination with apparatus as defined in claim 4, means having two conditions of operation for monitoring said transmitted digits when the position of said distributor is subsequent to that in which framing digits are received when said receiver is in phase, said monitoring means producing a first kind of output for each of said framing digits and a second kind of output for at least one of said encoding digits when in one of said two conditions and said second kind of output for each of said framing digits and said first kind of output for at least one of said encoding digits when in the other of said two conditions, means for changing the condition of operation of said monitoring means when said monitoring means output is said second kind, and means for further retarding said timing means output when said sampling means output causes said timing means output to be retarded and said monitoring means output immediately subsequent thereto is said second kind.

6. In combination with apparatus as defined in claim 4, means for limiting, when out-of-frame, the retardation of said timing means output to the duration of one of said framing digits for each sampling cycle of said sampling means, means for rendering said phasing means inoperative when said retardation occurs as a result of one of said transmitted digits other than the first digit sampled during one of said sampling cycles, and means for changing the condition of operation of said sampling means when said retardation occurs as a result of one of said sampled digits other than said first sampled digit and the second of said sampled digits causes said sampling means output to be said second kind.

7. In a pulse communication system in which framing digits of the On-Off pulse type are periodically transmitted with encoding digits, receiver apparatus comprising a decoder, a plurality of output channels, a distributor for distributing the output of said decoder to said output channels, and control means responsive to said framing and encoding digits for establishing and maintaining said decoder and said distributor in phase with said encoding digits, said control means comprising timing means for producing timing pulses which, when correctly phased with said framing and encoding digits and applied to said decoder and said distributor, cause said encoding digits to be correctly decoded and distributed to said output channels, means for applying said timing pulses to said decoder and said distributor, bistable means responsive to said distributor for producing an On-Off type of output which alternates at the same rate as said framing digits and in synchronism with said framing digits when said receiver is in phase, means for comparing said framing and encoding digits with said bistable means output and producing a first kind of output when said digits and said bistable means output agree and a second kind of output when said digits and said bistable means output disagree, gating means for passing said comparing means outputs when the position of said distributor is that in which said framing digits are received when said receiver is in phase, means for deriving an error signal related to one of said two kinds of comparing means outputs passed by said gating means, means responsive to said error signal for causing the output of said timing means to be retarded in phase, and means for reversing the phase of said bistable means with respect to said distributor before said timing means output is retarded when the subsequent output from said comparing means is said one of said two kinds of outputs.

8. In combination with apparatus as defined in claim 7, a second bistable means responsive to said distributor for producing an On-Off type of output which alternates at the same rate as said framing digits, second comparing means for comparing said framing and encoding digits with said second bistable means output and producing a first kind of output when said digits and said second bistable means output agree and a second kind of output when said digits and said second bistable means output disagree, second gating means for passing said second comparing means outputs occurring subsequent to the first mentioned comparing means outputs passed by the first mentioned gating means, means for reversing the phase of said second bistable means with respect to said distributor when said second gating means passes one of said two kinds of outputs, and means for further retarding said timing means output each time said error signal causes timing means to be retarded and said second comparing means output immediately subsequent to said first mentioned comparing means output comprises said one of said two kinds of outputs.

9. In combination with apparatus as defined in claim 7, means for limiting, when out-of-frame, the retardation of said timing means output to the duration of one of said framing digits for each time said gating means is enabled to pass said comparing means outputs, means for rendering said reversing means inoperative when the first of said outputs passed by said gating means each time said gating means is enabled comprises the other of said two kinds of outputs, and means for reversing the phase of said bistable means with respect to said distributor when said retardation occurs as a result of one of said outputs other than said first output and the second of said outputs passed during the time said gating means is enabled comprises said one of said two kinds of outputs.

10. In a pulse communication system in which framing digits of the On-Off pulse type are inserted in the same relative time slots in successive frames of received digits for framing purposes, receiver apparatus comprising a distributor, decoding means, means responsive to said received digits for producing timing pulses which when applied to said distributor cause said distributor to complete one cycle for each of said received digit frames, means for applying said timing pulses to said distributor and said decoding means, time slot sampling means providing an On pulse output for each On pulse in said received digits when in a first condition of operation and for each OFF pulse in said received digits when in a second condition of operation, means for alternating said conditions of operation at the same rate said framing digits alternate, means adapted to pass said sampling means output during a first preassigned portion of said distributor cycle equal in duration to the number of said time slots containing said framing digits in one of said frames, means for deriving a signal related to said sampling means output passed during said first preassigned portion, means responsive to said signal for retarding the phase of said timing pulses by one time slot, and means responsive to said signal for changing the condition of said sampling means when said sampling means provides an On pulse output during a second portion of said distributor cycle immediately following said first portion.

11. In combination with apparatus as defined in claim 10 wherein said digit frames comprise encoded message samples of equal time durations and framing information of a different time duration, means responsive to said timing pulses for retarding the phase of said timing pulses once during each of said distributor cycles by a time interval equal to said different time duration.

12. In a pulse communication system in which a framing digit, comprising alternately a pulse and a space, is inserted in the same relative time slot in successive frames of received digits for framing purposes, receiver apparatus comprising a distributor, decoding means, means responsive to said received digits for producing timing pulses which when applied to said distributor cause said distributor to complete one cycle for each of said received digit frames, means for applying said timing pulses to said distributor and said decoding means, time slot sampling means providing a pulse output for each pulse in said received digits when in a first condition of operation and for each space in said received digits when in a second condition of operation, means for changing the condition of said sampling means once during each of said distributor cycles, gating means adapted to pass said sampling means output when the position of said distributor is that in which a framing digit is received when said system is in frame, means for deriving a signal related to said sampling means output passed by said gating means, means responsive to said signal for retarding the phase of said timing pulses by one time slot, and means responsive to said signal for changing the condition of said sampling means when said sampling means provides a pulse output immediately following said sampling means output passed by said gating means.

13. In combination with apparatus as defined in claim 12 wherein said digit frames comprise encoded message samples of equal time durations and framing information of one time slot duration, means for retarding in phase by one time slot said timing pulses when the position of said distributor is that in which a framing digit is received when said system is in frame.

14. In a pulse communication system in which a framing digit of the On-Off pulse type is inserted in the same relative time slot in successive frames of received digits for framing purposes, receiver apparatus comprising a distributor, decoding means, means responsive to said received digits for producing timing pulses which when applied to said distributor cause said distributor to complete one cycle for each of said received digit frames, means for applying said timing pulses to said distributor and said decoding means, two time slot sampling means each of which provides a pulse output for each pulse in said received digits when in a first condition of operation and for each space in said received digits when in a second condition of operation, means for changing the condition of both of said sampling means at the same rate said framing digits alternate, first gating means adapted to pass said output from one of said sampling means during a first preassigned portion of said distributor cycle equal in duration to one time slot, means for deriving a signal related to said sampling means output passed by said first gating means, means responsive to said signal for retarding the phase of said timing pulses by one time slot, second gating means adapted to pass said output from the other of said sampling means during a second preassigned portion of said distributor cycle equal in duration to three time slots and occurring immediately after said first preassigned portion, means for changing the condition of operation of said other sampling means when said other sampling means output comprises a pulse, means responsive to pulses passed by said second gating means during the first of said three time slots for further retarding said timing pulses when said timing pulses are retarded by said signal, and means for changing the condition of operation of said one sampling means when said timing pulses are retarded and said output from said one sampling means subsequent thereto comprises a pulse.

15. In combination with apparatus as defined in claim 14 wherein said digit frames comprise encoded message samples of equal time durations and framing information of one time slot duration, means for retarding in phase by one time slot said timing pulses when the position of said distributor is that in which a framing digit is received when said system is in frame.

16. In a pulse communication system in which a pair of framing digits of the On-Off type are inserted in the same relative time slots in successive frames of received digits for framing purposes, receiver apparatus comprising a distributor, decoding means, means responsive to said received digits for producing timing pulses which when applied to said distributor cause said distributor to complete one cycle for each of said received digit frames, means for applying said timing pulses to said distributor and said decoding means, time-slot sampling means providing a pulse output for each pulse in said received digits when in a first condition of operation and for each space in said received digits when in a second condition of operation, means for changing the condition of said sampling means at the same rate said framing digits alternate, gating means adapted to pass said output from said sampling means during a first preassigned portion of said distributor cycle equal in duration to two time slots, means for deriving a signal related to said sampling means output passed by said gating means, means responsive to said signal for retarding the phase of said timing pulses by one time slot, and means for changing the condition of said sampling means before said timing pulses are retarded by said signal when said gating means passes a pulse during the second of said two time slots.

17. In combination with apparatus as defined in claim 16 wherein said digit frames comprise encoded message samples of equal time durations and framing information of two time-slot duration, means for retarding in phase by two time slots said timing pulses when the position of said distributor is that in which framing digits are received when said system is in frame.

References Cited in the file of this patent

UNITED STATES PATENTS 2,527,649 Peterson ---------------- Oct. 31, 1950
2,527,650 Peterson ---------------- Oct. 31, 1950